United States Patent [19]
Musschoot

[11] 3,848,343
[45] Nov. 19, 1974

[54] VERTICAL LIFT CONVEYOR
[75] Inventor: Albert Musschoot, Barrington, Ill.
[73] Assignee: General Kinematics Corporation, Barrington, Ill.
[22] Filed: Feb. 9, 1973
[21] Appl. No.: 331,331

Related U.S. Application Data
[60] Division of Ser. No. 118,633, Feb. 25, 1971, which is a continuation-in-part of Ser. No. 843,531, July 22, 1969, abandoned.

[52] U.S. Cl. .................................. 34/164, 241/175
[51] Int. Cl. ... F26b 15/08, B02c 19/00, B02c 21/00
[58] Field of Search ............. 34/164; 417/241, 400; 198/220 A, 220 BA; 241/175

[56] References Cited
UNITED STATES PATENTS
| | | | |
|---|---|---|---|
| 1,260,574 | 3/1918 | Pogue | 417/241 |
| 2,553,543 | 5/1951 | Bodine, Jr. | 417/241 |
| 3,421,591 | 1/1969 | Webb | 198/220 |
| 3,710,453 | 1/1973 | Whelpley | 34/164 |

FOREIGN PATENTS OR APPLICATIONS
| | | | |
|---|---|---|---|
| 3,113 | 10/1891 | Sweden | 198/220 |
| 668,179 | 3/1952 | Great Britain | 198/220 |
| 222,234 | 3/1968 | U.S.S.R. | 198/220 |

Primary Examiner—Charles J. Myhre
Assistant Examiner—Paul Devinsky
Attorney, Agent, or Firm—Hofgren, Wegner, Allen, Stellman & McCord

[57] ABSTRACT

A vibratory vertical lift conveyor including a vertically elongated, tubular lift assembly having an inlet at its lower end and an outlet at its upper end. The assembly is provided with generally L-shaped projections extending from end to end within the interior of the assembly to provide for material lifting action when the assembly is vibrating in a vertical direction. Additionally provided is a yieldable connection between the vibrator and the lift assembly to accommodate startup of the conveyor; a mulling sphere within the tubular assembly received therein for limited movement between the projections to mull particulate material passing upward in the assembly; a backflow preventing device at the inlet to preclude backflow of material within the inlet when the vibratory conveyor is moving downwardly; and a manifold and inlet for a treating gas for treating material as it passes upwardly within the assembly.

5 Claims, 4 Drawing Figures

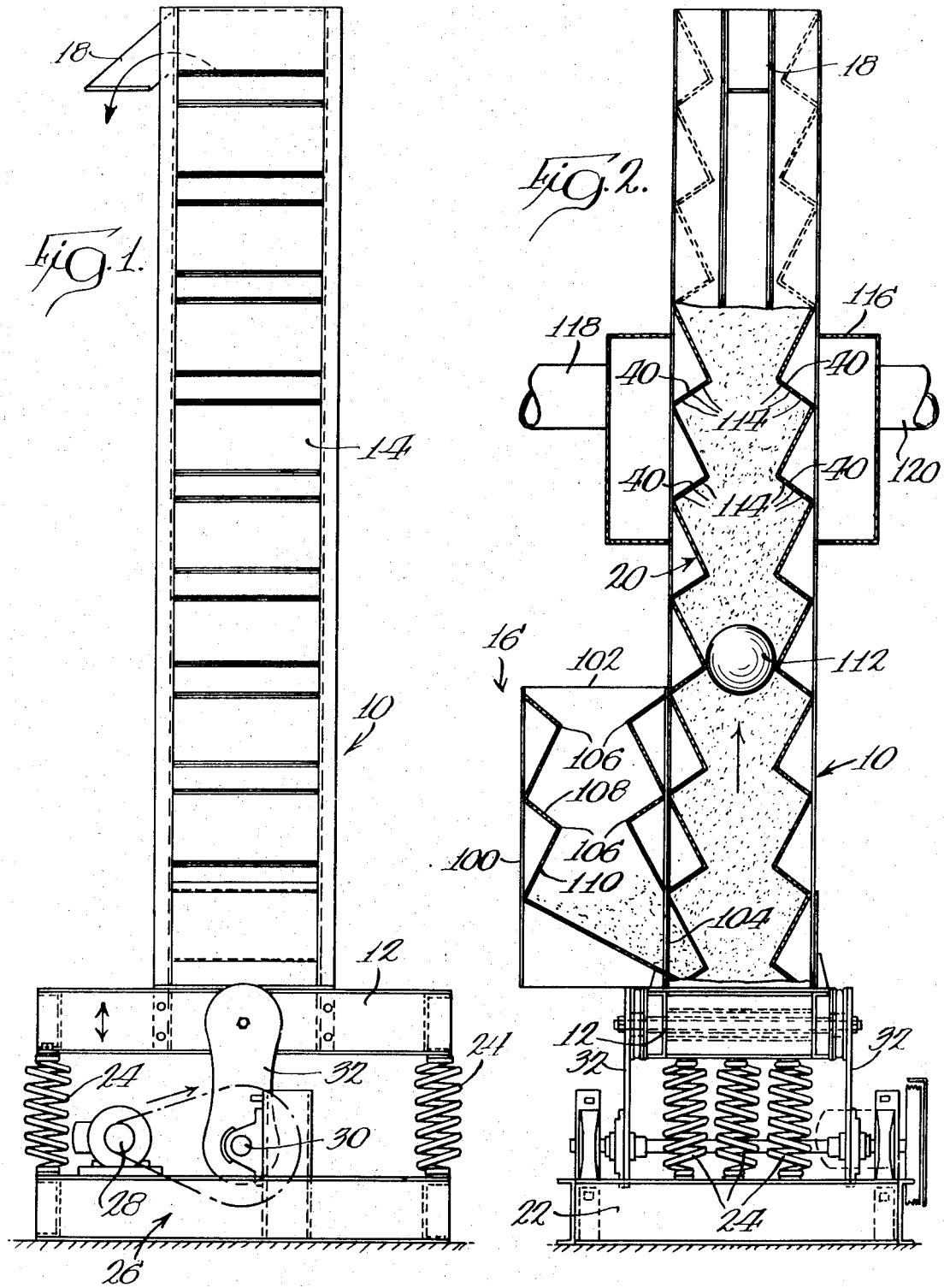

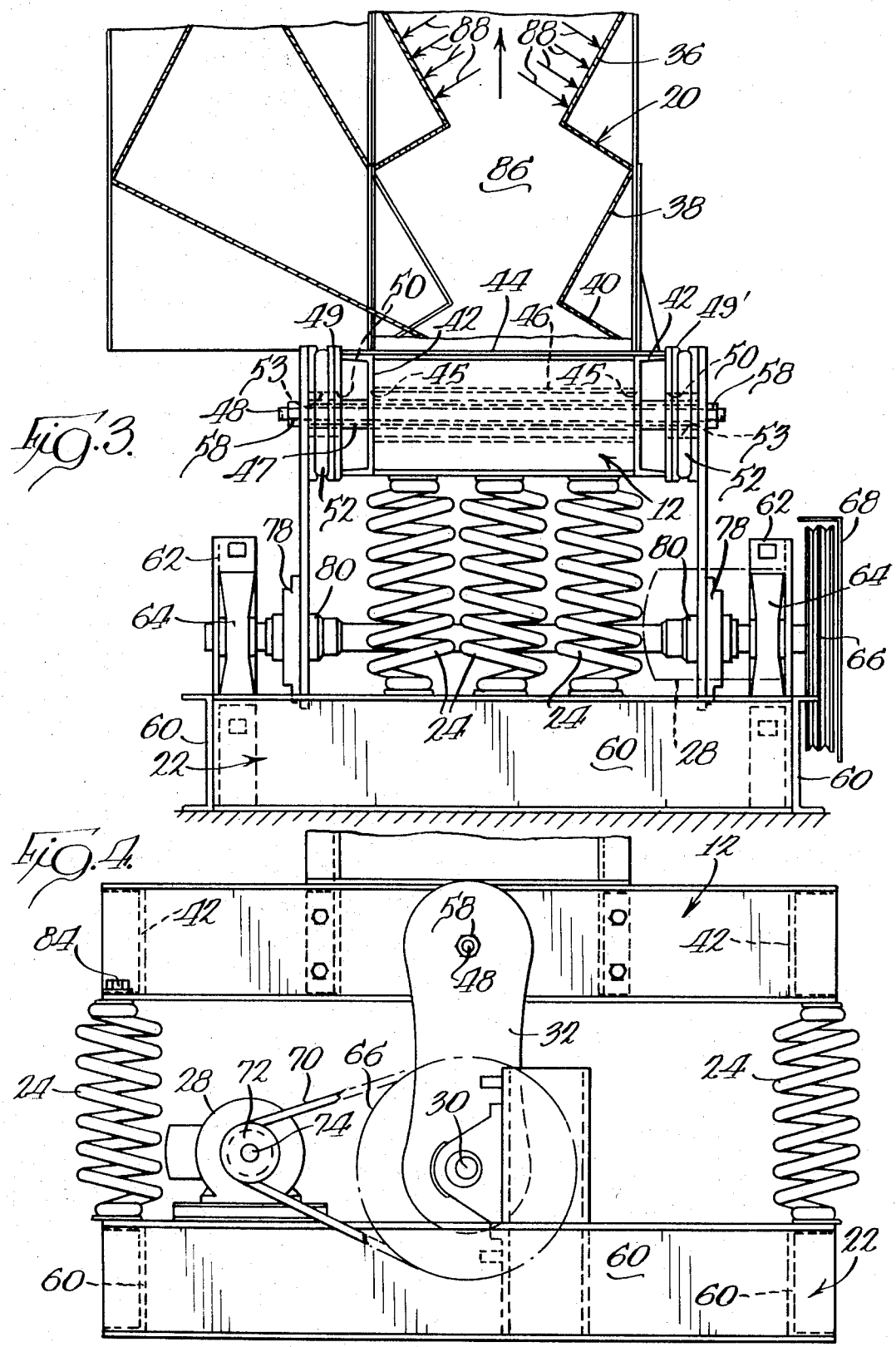

VERTICAL LIFT CONVEYOR

CROSS-REFERENCE

This application is a division of my copending application Ser. No. 118,633, filed Feb. 25, 1971, entitled "Vertical Lift Conveyor" and assigned to the same assignee as the instant application; which in turn was a continuation-in-part of my copending application Ser. No. 843,531, filed July 22, 1969, entitled "Vertical Lift Conveyor," now abandoned.

BACKGROUND OF THE INVENTION

In recent years, there has been increasing reliance upon vibratory conveyors for various conveying purposes principally because of their low energy requirements and the relatively few moving parts involved. Most such vibratory conveyors are utilized for conveying material in a generally horizontal direction and a few have been devised for generally vertical conveying movement of material.

Most such vertical vibratory conveyors have not been as successful as might be desired in that they generally have been designed as a spirally wound ramp with the net result that the conveying surface is extremely long so that the conveying rate is rather slow.

SUMMARY OF THE INVENTION

The invention seeks to provide a new and improved vibratory, vertical lift conveyor which includes a vertically elongated, tubular housing having an inlet at its lower end and an outlet at its upper end. Extending from end to end within the housing and along at least a portion of the interior wall thereof are a plurality of adjacent L-shaped projections which have their long side uppermost and their short side lowermost. According to the exemplary embodiment, the angle between the long and short side of each L-shaped projection is about 90° and each is arranged within the housing so that the short side is at an angle of about 60° with respect to the longitudinal axis of the housing.

The housing is mounted on a vibrating base which, in turn, is secured by means of springs to a stationary base. The stationary base mounts a rotary motor which drives an eccentric shaft. The eccentric shaft is connected to the vibrating frame by means of a connecting rod and when the shaft is rotated, the vibrating base and thus the housing will be vibrating in a vertical direction to provide up and down movement thereof.

The overall arrangement of the motor, the eccentric shaft and the connecting rod is such that the downward motion of the lift assembly includes an acceleration greater than the acceleration due to gravity so that the assembly will move downwardly more rapidly than the material resulting in relative motion between the casing and the material.

When the assembly is moved upwardly, particulate material therein is compressed and the internal shear planes of material friction operate to momentarily support the material during such upward movement.

The overall result is that the material is advanced upwardly within the housing until it reaches the outlet where the same is discharged.

Also provided is a means associated with the inlet for precluding backflow of the particulate material within the inlet during downward movement of the lift assembly. While such means may take on the form of any suitable check valve assembly, according to the preferred embodiment, the same is comprised of a device configured in the form of the lift assembly but shorter in length and inverted so as to positively drive material into the lower end of the lift assembly.

In addition to pure conveying applications, the invention further contemplates that the conveyor may be used as a combination conveyor and processor. According to one embodiment of the invention, one or more mulling objects, normally in the form of cylinders, may be located within the lift assembly. The objects are of sufficiently great size so they may not pass downwardly within the lift assembly past a given set of projections but of sufficiently small size so that some movement of the object within the lift assembly is permitted to provide a mulling action on the material as it passes by the moving object. In addition, the material passing through the conveyor may be treated with a suitable gas if desired by the provision of gas inlet means on the lower side of the projection in communication with the manifold which may then be flexibly connected to a source of appropriate gas for the treatment.

Finally, the invention contemplates a unique connection between the vibrating means and the lift assembly to accommodate relative movement therebetween during startup so that during startup the vibrating means is not subject to extremely high loads due to the inertia of a fully loaded lift assembly.

Other objects and advantages of the invention will become apparent from the following specification taken in conjunction with the accompanying drawings.

DESCRIPTION OF THE DRAWINGS

FIG. 1 is a side elevation of an exemplary embodiment of a vibratory, vertical conveyor made according to the invention;

FIG. 2 is a front elevation of the conveyor with parts broken away for clarity;

FIG. 3 is an enlarged, fragmentary front elevation again with parts broken away for clarity; and FIG. 4 is an enlarged, fragmentary side elevation illustrating certain details of a vibrating means.

DESCRIPTION OF THE PREFERRED EMBODIMENT

An exemplary embodiment of a vibratory, vertical feeder made according to the invention is seen in FIGS. 1 and 2 and includes a lift assembly, generally designated 10, which, in turn, is comprised of a vibratory base 12 and a tubular housing, generally designated 14.

The housing 14 includes an inlet 16 adjacent its lower end and an outlet 18 adjacent its upper end. Within the tubular housing 14 and extending from end to end thereof along opposite sides are lifts, generally designated 20, which define a scalloped configuration and which will be explained in greater detail hereinafter.

The vibratory base 12 is located above a stationary base 22 and interposed between the vibratory base 12 and the stationary base 22 are a plurality of springs 24 which mount the vibratory base 12 to permit movement relative to the stationary base 22.

The stationary base 22 additionally mounts vibrating means, generally designated 26, which cause vibration of the lift assembly 10 relative to the stationary base 22 in a vertical direction. The vibrating means 26 include a rotary motor 28 which is drivingly connected to an eccentric shaft 30 which, in turn, reciprocates a connecting rod 32 connected to the vibratory base 12 to give the latter an up and down motion.

Turning now to FIG. 3, the tubular housing 14, which is generally rectangular in cross section, (although the cross sectional shape may differ depending upon the point at which it is taken) is seen to comprise opposed end walls 34 (only one of which is shown) separated by opposed side walls 36 which are formed of the lifts 20.

Each lift 20 is formed as a generally L-shaped, inwardly directed projection in the interior of the housing 14 with the long side or surface 38 thereof uppermost and the short side or surface 40 thereof lowermost. The lower surface 40 converges toward the lowermost extent of the upper surface 38 which, in turn, diverges toward the lowermost extent of lower surface 40 of the upwardly adjacent projection.

According to one embodiment, the angle between the long side 38 and the short side 40 of each lift 20 is 90° and the angle of the short side 40 with respect to the longitudinal axis of the housing 14 is about 60°.

The vibratory base 12 mounts the housing 14 on the upper end thereof and to this end, the vibratory base 12 is formed of a plurality of C-shaped channels 42 which are connected together by any suitable means. A bottom plate 44, which seals the bottom of the tubular housing 14 is secured to the upper flanges of the channels 42, by any suitable means as well as the housing 14. Two of the opposed channels 42 include aligned, enlarged apertures 45 interconnected by a pipe 46. Extending through the apertures 45 and the center of the pipe 46 is a second, smaller pipe 47 which houses a threaded rod 48.

Impaled upon opposite ends of the rod 48 are clamping plates 49 which abut the channels 42 having the apertures 45. Each of the clamping plates 49 includes an enlarged aperture 50 of approximately the same diameter as the apertures 45. Outwardly of the clamping plates 49 on each end of the rod 48 are located rubber bumpers or donuts 52 provided with enlarged apertures 53, again having approximately the same diameter as the apertures 45. The rubber donuts 52 are then sandwiched between the plates 49 and the connecting rods 32. Nuts 58 on the threaded rod 48 hold the assemblage in the just described condition which results in a flexible, pivotal connection of the connecting rods 32 to the vibrating base 12.

As a result of the foregoing, a flexible connection is established between the vibrating means and the lift assembly that precludes overloading of the vibrating means during startup, particularly when the lift assembly is fully loaded with material. More particularly, without the flexible connection, during startup the vibrating means would impart movement to the lift assembly equal to its full vertical stroke during operation. And such movement would have to be imparted without appreciable assistance from the springs 24 since, with the conveyor inoperative, the same would not be in a resonant condition. However, with the connection, the full vertical stroke of the lift assembly need not take place during startup as motion may be lost in the connection with the energy absorbed by the rubber donuts 52. Gradually the slippage will diminish until such time as the lift assembly is vibrating normally with the assistance of the springs 24 in a resident condition.

Impaled upon opposite ends of the rod 48 are clamping plates 49 which abut the channels 42 having the apertures 45. Outwardly of the clamping plates 49 on each end of the rod 48 are located rubber bumpers 56 for vibration isolation purposes which are then sandwiched between the plates 49 by the connecting rods 32. Nuts 58 serve to hold the assemblage in the just described condition which results in a pivotal connection of the connecting rods 32 to the vibrating base 12.

As seen in FIGS. 3 and 4, the stationary base 22 is also formed of a plurality of channels 60 and two of the opposed channels 60 mount upwardly projecting channel sections 62 having pillow block bearings 64 in which the eccentric shaft 30 is disposed.

At one end of the eccentric shaft 30 there is mounted a double grooved sheave 66 which may be partially covered by a guard 68. As best seen in FIG. 4, a pair of V belts 70 extend from the sheave 66 to a sheave 72 mounted on the output shaft 74 of a rotary motor 28.

Intermediate the pillow block bearing 64 are a pair of eccentric bearings 78 which are connected to the connecting rods 32. Eccentric sleeves 80 secured to the shaft 30 for rotation therewith are received within respective ones of the bearings 78 so that when the motor 28 is energized to drive the shaft 30, the connecting rods 32 will be reciprocated.

Completing the vibratory conveyor are the springs 24 which, as mentioned previously, are interposed between the vibratory base 12 and the stationary base 22 to support the former above the latter for vibratory motion in a vertical direction. Any suitable securing means such as bolts 84 (only one of which is shown) may be used to secure opposite ends of the springs 24 to aligned ones of the channels 42 and 60.

Of course, the springs 24 must be chosen so that there will be resonant frequency operation for vibration of the lift assembly when the motor 76 is operated to cause vibration of the lift assembly and this may be accomplished by techniques well known in the art. Furthermore, it is necessary that the arrangement of the motor 76, the eccentric shaft 30 and the connecting rod 32 be such that during the downward movement portion of each vibration cycle, the lift assembly 10 will be accelerated downwardly at a rate faster than acceleration due to gravity so that there will be relative movement between material 86 within the housing 14 and the housing 14.

The necessity for this relationship will be appreciated from the following description of the operation which is made with reference to FIG. 3. The material 86 within the passageway defined by the walls 34 and 36 will, when the lift assembly 10 is moved upwardly, exert a force against the long sides 38 of the L-shaped projections 20 as indicated by arrows 88 and the internal shear planes of the material operate to momentarily support the material during such upward movement. As a result, the material 86 is advanced upwardly within the housing 14.

When the direction of movement of the lift assembly 10 is reversed and the same moves downwardly, because the same will be accelerated downwardly at a rate more rapidly than the material 86 will be accelerated downwardly by gravity, a certain portion of the material 86 will remain substantially in the position to which it was moved during the upward portion of the cycle (a certain amount of settling will, of course, occur but the ultimate result will be advancement of the material 86); and when the direction of movement of the lift assembly 10 is again reversed, further advancement of the material 86 will occur in the manner mentioned previously.

Of additional importance is the manner in which the lifts 20 operate upon the material 86. The configuration of the lifts 20 is such that the long surface 36 forming each L-shaped projection comprising the lift 20 will, during upward movement of the assembly, tend to compress the material 86 so as to maximize the friction in the internal shear planes of the material. On the other hand, the construction is such that during downward movement of the lift assembly, such compression is released allowing the material to be subjected substantially only to the influence of gravity. The overall result may best be described as upward movement of the material in a differential manner.

Returning now to FIG. 2, other features of the invention will be described. In particular, it will be recalled that means are preferably provided at the inlet 16 for preventing backflow of the material during downward movement of the lift assembly 10. According to the exemplary embodiment, such means are included in a tubular inlet housing 100 having an open upper end 102 into which the material to be conveyed may be introduced. The housing 100 includes a lower end 104 in communication with the lower end of the lift assembly 10. Intermediate the ends 102 and 104 of the housing 100 are a series of projections 106 configured generally along the lines of the projections employed in the lift assembly but inverted with regard thereto. That is, each of the projections 106 includes a short upper side 108 and a long lower side 110.

The conveying action imparted to the material by the projections 106 will be opposite that mentioned previously in conjunction with the lift assembly 10 so that the material will be positively fed from its point of introduction at the opening 102 downwardly to the opening 104 at the bottom of the lift assembly 10 180° out of phase of the feeding of the material within the lift assembly 10. That is, when the lift assembly 10 is moving downwardly, there will be positive feeding from the inlet 106 to the bottom of the lift assembly 110 to occupy the space therein just vacated by the material within the lift assembly.

FIG. 2 also illustrates various modifications to the basic conveyor structure to enable the same to perform a processing function as well as a conveying one if desired. For example, one or more spherical objects 112 may be provided within the interior of the lift assembly 10 to provide a mulling action on the material therein. As illustrated in FIG. 2, the object 112 is in the form of a cylinder having a diameter sufficiently large that it cannot pass downwardly between corresponding ones of the projections but of sufficiently small size so that some movement of the same is permitted within the space between adjacent projections. The vibrating action imparted to the lift assembly 10 and thus to the object 112 will cause the same to oscillate within the space to provide a mulling or grinding action on the materials being conveyed.

Also illustrated in FIG. 2 is structure for gas treating the material within the lift assembly 10 as it is being passed upwardly therein. In particular, certain of the lower surfaces 40 of the projections are provided with a plurality of apertures 114 to establish fluid communication between the interior of the lift assembly 10 and the exterior thereof. Surrounding the apertured ones of the lower surfaces 40 is a manifold 116 having an inlet 118 and an outlet 120 which may be suitably connected by flexible hose or the like to a source of an appropriate gas to be utilized in treating the material and to an exhausting or recycling system. Thus, a suitable treating gas may be introduced into the interior of the lift assembly 10 to treat the material therein through the inlet conduit 118, the manifold 116 and the apertures 114 and exhausted, if desired, through the outlet 120.

From the foregoing, it will be appreciated that the invention provides a unique, vertically oriented vibratory lift conveyor ideally suited for pure conveying operations as well as combined conveying and processing operations.

Having described a preferred embodiment of my invention as required by 35 U.S.C. 112, I do not wish to be limited to the details set forth, but rather, to have my invention construed broadly according to the following claims.

I claim:

1. A lift conveyor of the vibratory type including a stationary base, a tubular non-horizontally elongated lift assembly having an inlet at its lower end and an outlet at its upper end, said lift assembly including a plurality of opposed, horizontally aligned, inwardly directed projections extending between said ends with each projection being defined by an upper surface and a lower surface with the upper surface having a longer length than the lower surface, vibrating means associated with said lift assembly for moving said lift assembly up and down in a non-horizontal direction, and operative to accelerate said lift assembly in a downward direction at a rate greater than the rate of acceleration of gravity; means associated with said inlet for precluding backflow of material during movement of said lift assembly in a downward direction; and a mulling device within said lift assembly, said mulling device comprising an object sufficiently large so as to be engaged by said projections to preclude downward movement of the object therepast and sufficiently small so as to be movable above the projections that it may engage whereby during vibration of said lift assembly, movement of said object therein provides mulling action on material passing through said lift assembly.

2. A lift conveyor of the vibratory type including a stationary base, a tubular non-horizontally elongated lift assembly having an inlet at its lower end and an outlet at its upper end, said lift assembly including a plurality of opposed, horizontally aligned, inwardly directed projections extending between said ends with each projection being defined by an upper surface and a lower surface with the upper surface having a longer length than the lower surface; vibrating means associated with said lift assembly for moving said lift assembly up and down in a non-horizontal direction, and operative to accelerate said lift assembly in a downward direction at a rate greater than the rate of acceleration of gravity; means associated with said inlet for precluding backflow of material during movement of said lift assembly in a downward direction; gas inlet means in the lower surfaces of at least some of said projections, a gas manifold at least partially surrounding said lift assembly and in fluid communication with said gas inlet means, and means for conducting a treating gas to said gas manifold whereby material in said lift assembly may be treated by gas flowing from said manifold to said inlet means into said lift assembly during upward movement of the material in said lift assembly.

3. A lift conveyor of the vibratory type including a stationary base, a tubular non-horizontally elongated lift assembly having an inlet at its lower end and an outlet at its upper end, said lift assembly including a plurality of opposed, horizontally aligned, inwardly directed projections extending between said ends with each projection being defined by an upper surface and a lower surface with the upper surface having a longer length than the lower surface; vibrating means associated with said lift assembly for moving said lift assembly up and down in a non-horizontal direction, and operative to accelerate said lift assembly in a downward direction at a rate greater than the rate of acceleration of gravity; means associated with said inlet for precluding backflow of material during movement of said lift assembly in a downward direction; and work performing means on said lift assembly for treating material conveyed thereon.

4. A lift conveyor according to claim 3 wherein said work performing means comprises a mulling object sufficiently large so as to be engaged by said projections to preclude downward movement of the object therepast and sufficiently small so as to be movable relative to the projections that it may engage.

5. A lift conveyor according to claim 3 wherein said work performing means includes a gas manifold surrounding said lift assembly and gas inlet means in fluid communication with said manifold and the interior of said lift assembly for directing gas to the interior of said lift assembly.

* * * * *